: US012174951B2

United States Patent
Shibahara et al.

(10) Patent No.: US 12,174,951 B2
(45) Date of Patent: Dec. 24, 2024

(54) LEVEL ESTIMATION DEVICE, LEVEL ESTIMATION METHOD, AND LEVEL ESTIMATION PROGRAM

(71) Applicant: NIPPON TELEGRAPH AND TELEPHONE CORPORATION, Tokyo (JP)

(72) Inventors: Toshiki Shibahara, Musashino (JP); Hirokazu Kodera, Musashino (JP); Daiki Chiba, Musashino (JP); Mitsuaki Akiyama, Musashino (JP); Kunio Hato, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 288 days.

(21) Appl. No.: 17/766,739

(22) PCT Filed: Oct. 9, 2019

(86) PCT No.: PCT/JP2019/039865
§ 371 (c)(1),
(2) Date: Apr. 6, 2022

(87) PCT Pub. No.: WO2021/070291
PCT Pub. Date: Apr. 15, 2021

(65) Prior Publication Data
US 2023/0103084 A1    Mar. 30, 2023

(51) Int. Cl.
*G06F 21/55* (2013.01)
*H04L 9/40* (2022.01)

(52) U.S. Cl.
CPC ........ *G06F 21/554* (2013.01); *H04L 63/1425* (2013.01)

(58) Field of Classification Search
CPC ... G06F 21/554; G06F 21/552; H04L 63/1425
See application file for complete search history.

(56) References Cited

U.S. PATENT DOCUMENTS

| 8,892,391 B2 * | 11/2014 | Tu ............................. G01D 1/16 |
| | | 702/141 |
| 11,151,468 B1 * | 10/2021 | Chen ......................... G06N 7/01 |
| (Continued) | | |

FOREIGN PATENT DOCUMENTS

| CN | 107743701 A | 2/2018 |
| JP | 2016-24786 A | 2/2016 |

OTHER PUBLICATIONS

Roundy et al., "Smoke Detector: Cross-Product Intrusion Detection with Weak Indicators", In Proceedings of the 33rd Annual Computer Security Applications Conference, 2017, pp. 200-211.

*Primary Examiner* — Huan V Doan
(74) *Attorney, Agent, or Firm* — XSENSUS LLP

(57) ABSTRACT

A level estimation apparatus includes processing circuitry configured to receive event logs of events detected by a device or software, and calculate degrees of similarity among the events indicated by the event logs with use of the event logs, and estimate a level of a predetermined event based on the calculated degrees of similarity among the events and a level of at least one of the events, wherein in the calculation of the degrees of similarity among the events, when a degree of similarity between events detected by different devices or items of software is calculated, a degree of similarity to a common event is used, the common event being an event that has been detected mutually by the different devices or items of software.

10 Claims, 8 Drawing Sheets

(56) References Cited

U.S. PATENT DOCUMENTS

| | | |
|---|---|---|
| 2016/0226904 A1 | 8/2016 | Bartos et al. |
| 2016/0344757 A1 | 11/2016 | Bartos et al. |
| 2017/0034200 A1* | 2/2017 | Costin ................... G06F 21/577 |
| 2017/0302516 A1* | 10/2017 | Tang ................... H04L 41/0813 |
| 2019/0095618 A1 | 3/2019 | Lim |
| 2020/0285737 A1* | 9/2020 | Kraus ................... G06F 21/552 |
| 2020/0314118 A1* | 10/2020 | Levin ................... H04L 63/1425 |

* cited by examiner

Fig. 3

| VENDOR | EVENT NAME | CLIENT | TRANSMISSION SOURCE | DESTINATION | TIME |
|---|---|---|---|---|---|
| VENDOR A | C2 communication | Customer-1 | 192.168.1.1 | 192.0.2.1 | 2019/1/1 |
| VENDOR A | C2 communication | Customer-1 | 192.168.1.2 | 192.0.2.2 | 2019/1/1 |
| VENDOR B | Suspicious traffic | Customer-2 | 192.168.10.1 | 192.0.2.2 | 2019/1/2 |
| VENDOR B | C2 communication | Customer-1 | 192.168.10.2 | 192.0.2.3 | 2019/1/2 |
| VENDOR B | Suspicious traffic | Customer-2 | 192.168.10.3 | 192.0.2.5 | 2019/1/3 |

Fig. 4

| EVENT (VENDOR) | CLIENT | TRANSMISSION SOURCE | DESTINATION | TIME |
|---|---|---|---|---|
| C2 communication(VENDOR A) | Customer-1 | 192.168.1.1 | 192.0.2.1 | 2019/1/1 |
| | Customer-1 | 192.168.1.2 | 192.0.2.2 | 2019/1/1 |
| C2 communication(VENDOR B) | Customer-1 | 192.168.10.2 | 192.0.2.3 | 2019/1/2 |
| Suspicious traffic(VENDOR B) | Customer-2 | 192.168.10.1 | 192.0.2.2 | 2019/1/2 |
| | Customer-2 | 192.168.10.3 | 192.0.2.5 | 2019/1/3 |

| EVENT NAME | LEVEL |
|---|---|
| C2 communication | Primary |
| Suspicious traffic | Secondary |

LEVEL ESTIMATION DEVICE, LEVEL ESTIMATION METHOD, AND LEVEL ESTIMATION PROGRAM

CROSS-REFERENCE TO RELATED APPLICATION

The present application is based on PCT filing PCT/JP2019/039865, filed Oct. 9, 2019, the entire contents of which are incorporated herein by reference.

TECHNICAL FIELD

The present invention relates to a level estimation apparatus, a level estimation method, and a level estimation program.

BACKGROUND ART

In order to promptly discover a security incident (incident), such as an infection with malware an event log detected by a security device is monitored. Also, a technique has been proposed that, in order to estimate the level of an event detected by a security device (e.g., the magnitude of the possibility that an incident has occurred, etc.), uses the magnitude of a relationship between this event and a past incident (see Non Patent Literature 1).

CITATION LIST

Non Patent Literature

[Non Patent Literature 1] Kevin A Roundy, Acar Tamersoy, Michael Spertus, Michael Hart, Daniel Rats, Matteo Dell'Amico, and Robert Scott. 2017., Smoke Detector: Cross-Product Intrusion Detection With Weak Indicators. In Proceedings of the 33rd Annual. Computer Security Applications Conference. 200-211.

SUMMARY OF THE INVENTION

Technical Problem

Now, the events detected by a security device are increasing in number day by day in order to keep pace with changes in cyberattacks. With the related technique, a level is estimated based on the magnitude of a relationship between an event whose level is to be estimated and a past incident. Therefore, the related technique has the problem that, in a case where an even whose level is to be estimated is an event that precedes the occurrence of an incident, the level is estimated to be low. In view of this, an object of the present invention is to solve the aforementioned problem and estimate the level of an event detected by a security device with high accuracy.

Means for Solving the Problem

In order to achieve the aforementioned object, the present invention is characterized by including: processing circuitry configured to: receive event logs of events detected by a network device or an application; and calculate degrees of similarity among the events indicated by the event logs with use of the event logs, and estimate a level of a predetermined event based on the calculated degrees of similarity among the events and a level of at least one of the events. In the calculation of the degrees of similarity among the events, when a degree of similarity between events detected by different network devices or applications is calculated, a degree of similarity to a common event is used, the common event being an event that has been detected mutually by the different network devices or applications.

Effects of the Invention

According to the present invention, the level of an event detected by a security device can be estimated with high accuracy.

BRIEF DESCRIPTION OF DRAWINGS

FIG. 3 is a diagram showing examples of event logs.
FIG. 4 is a diagram showing examples of aggregated event logs.

DESCRIPTION OF EMBODIMENTS

Figure 1:
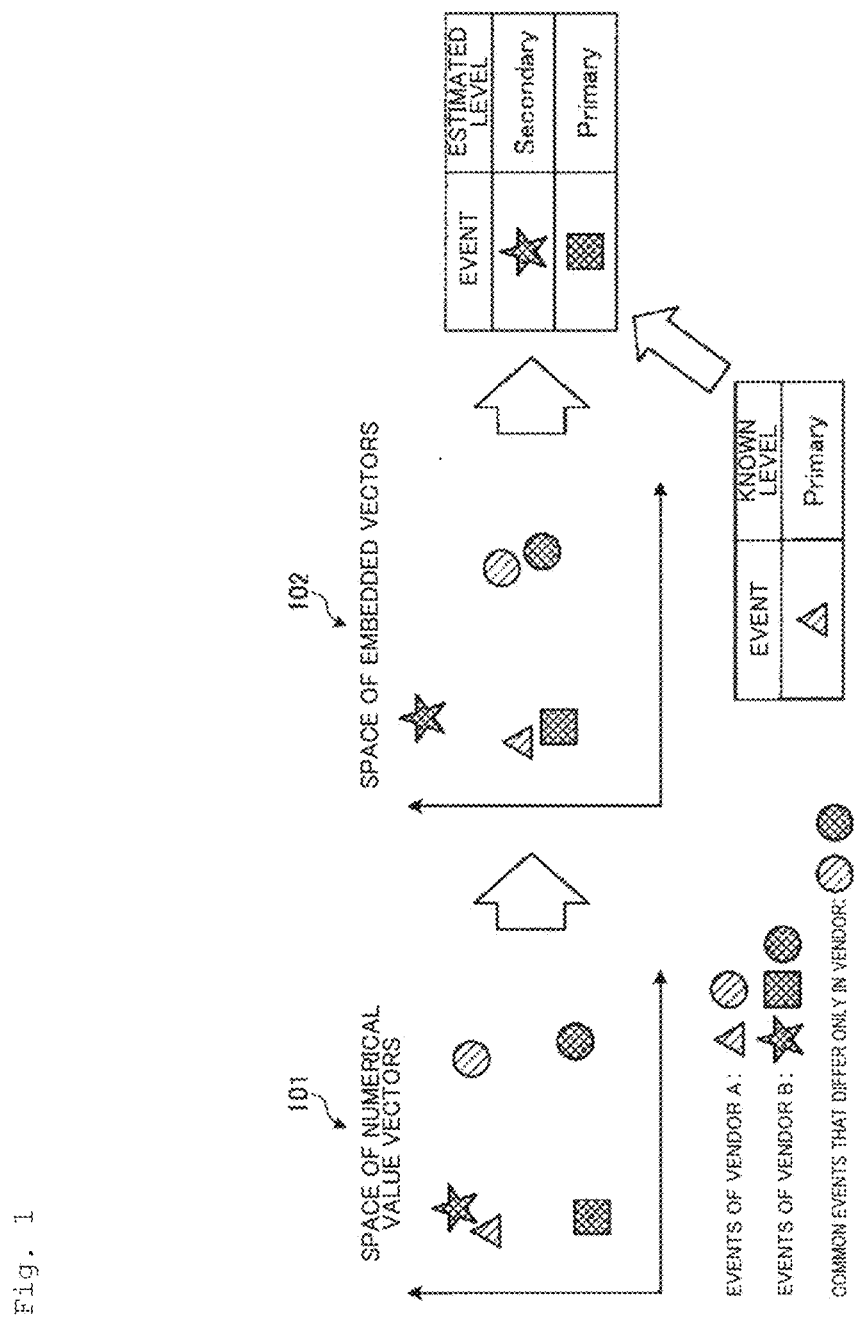
FIG. 1 is a diagram for describing an overview of a level estimation apparatus of a first embodiment.

The following describes modes (embodiments) for carrying out the present invention, which are separated into a first embodiment to a third embodiment, with reference to the drawings. The present invention is not limited to each embodiment.

Note that although the following description will be provided using an exemplary case where an event whose level is to be estimated by a level estimation apparatus is a security event detected by a security device, no limitation is intended by this For example, an event whose level is to be estimated may be an event detected by a network device or an application other than the security device. Also, the level of an event denotes, for example, the magnitude of the possibility that an incident related to security has occurred, the degree of importance of the event, and the like.

Furthermore, the security device may be realized by a dedicated hardware apparatus that detects an event, or may be realized by an application or software that detects an event.

First Embodiment

[Overview] An overview of a level estimation apparatus of the first embodiment will be described using FIG. 1. First, the level estimation apparatus aggregates event logs of security devices of the same vendor on a per-event basis among event logs of events detected by respective security devices (omitted in the drawing), and converts the event logs into numerical value vectors.

For example, as indicated by reference sign 101 in FIG. 1, the level estimation apparatus aggregates event logs of security devices of a vendor A on a per-event basis, and obtains a numerical value vector of the Δ mark and a numerical value vector of the ○ mark. Also, the level estimation apparatus 10 aggregates event logs of security devices of a vendor B on a per-event basis, and obtains a numerical value vector of the star mark, a numerical value vector of the □ mark, and a numerical value vector of the ○ mark.

It is assumed here that numerical value vectors include numerical value vectors of common events that differ from each other only in the vendor of the security device (numerical value vectors that differ from each other in the vendor of the security device but are related to the same event). For example, among the numerical value vectors indicated by reference sign 101 in FIG. 1, the numerical value vectors of the ○ marks are numerical value vectors of the same event that is detected mutually by the vendors A and B (common events).

The level estimation apparatus converts the aforementioned numerical value vectors into, for example, embedded vectors that satisfy the following two conditions.

(1) The similarity relationship among numerical value vectors of security devices of the same vendor is saved.

(2) Embedded vectors of common events are similar Co each other.

In this way, the level estimation apparatus converts the space of the numerical value vectors indicated by reference sign 101 into, for example, the space of the embedded vectors indicated by reference sign 102. That is to say, the level estimation apparatus performs the conversion so that, with respect to the embedded vectors of the security devices of the vendors A and B, the distance between the numerical value vectors of common events of the vendors A and B (the ○ marks in FIG. 1) is short while maintaining the similarity relationship among the numerical value vectors of the security devices of the same vendor, as indicated by reference sign 102.

Next, the level estimation apparatus estimates the level of the event of each embedded vector based on the degree of similarity to (the distance from) the embedded vector of the event with a known level (the Δ mark in FIG. 1) among the embedded vectors of the security devices of the vendors A and B obtained through the aforementioned processing.

For example, assume a case where the level of the event of the embedded vector represented by the Δ mark of the vendor A is "Primary" in FIG. 1. In this case, the level estimation apparatus estimates that the level of the event of the embedded vector located at a close distance from the embedded vector represented by the Δ mark in the space of the embedded vectors indicated by reference sign 102 (the embedded vector represented by the □ mark) is "Primary". On the other hand, the level estimation apparatus estimates that the level of the event of the embedded vector located at a far distance from the embedded vector represented by the Δ mark in the space of the embedded vectors indicated by reference sign 102 (the embedded vector represented by the star mark) is "Secondary".

In this way, even if an event detected by a security device is an event that precedes the occurrence of an incident, the level estimation apparatus can estimate the level of this event with high accuracy.

Also, the security devices of different vendors often observe communications of different networks. For this reason, such characteristics as a communication volume of communication used in event detection, and a user, often vary with each of the vendors of security devices. Therefore, with the related technique, the degree of similarity between events of security devices of different vendors may not be able to be calculated appropriately.

However, the level estimation apparatus of the present embodiment adjusts the degree of similarity between events detected by security devices of different vendors based on the degree of similarity to events that are common to security devices of different vendors (common events). In this way, the level estimation apparatus can appropriately calculate the degree of similarity between events of security devices of different vendors. As a result, the level estimation apparatus can estimate The levels of events with high accuracy.

[Configuration] Next, an exemplary configuration of the level estimation apparatus 10 will be described using FIG. 2. The level estimation apparatus 10 includes a log reception unit 11, a log aggregation unit 12, a numerical value vector generation unit 13, a level estimation unit 14, and a level output unit 15.

The log reception unit 11 accepts the inputs of event logs of events detected by each security device. These event logs include, for example, information for specifying a detected event (e.g., an event name) and identification information of a vendor of a security device that detected this event.

As shown in FIG. 3, an event log includes, for example, a vendor name of a security device that detected an event, an event name of this event, a client who uses this security device, a transmission source and a destination of communication in which this event has occurred, the time of the occurrence of this event, and the like.

Note that the aforementioned event name is, for example, information related to an infection with malware, information related to an attack against a server, a name detected by antivirus software, or the like. Also, although IP addresses are used as examples of a transmission source and a destination of communication, it is permissible to use domain names, IP address ranges, or the like other than IP addresses.

Furthermore, an event log may be a result detected by a security device, or may be a result detected by another apparatus with use of a communication log recorded by a security device. Moreover, an event log may include, for example, information of the direction of communication, blockage of communication, a model of a security device, and the like in addition to the information shown in FIG. 3. In addition, a single log may be recorded as an event log when an event has been detected once; however, for example, when the same event has been detected multiple times, these events may be collectively recorded as an event log.

Figure 2:
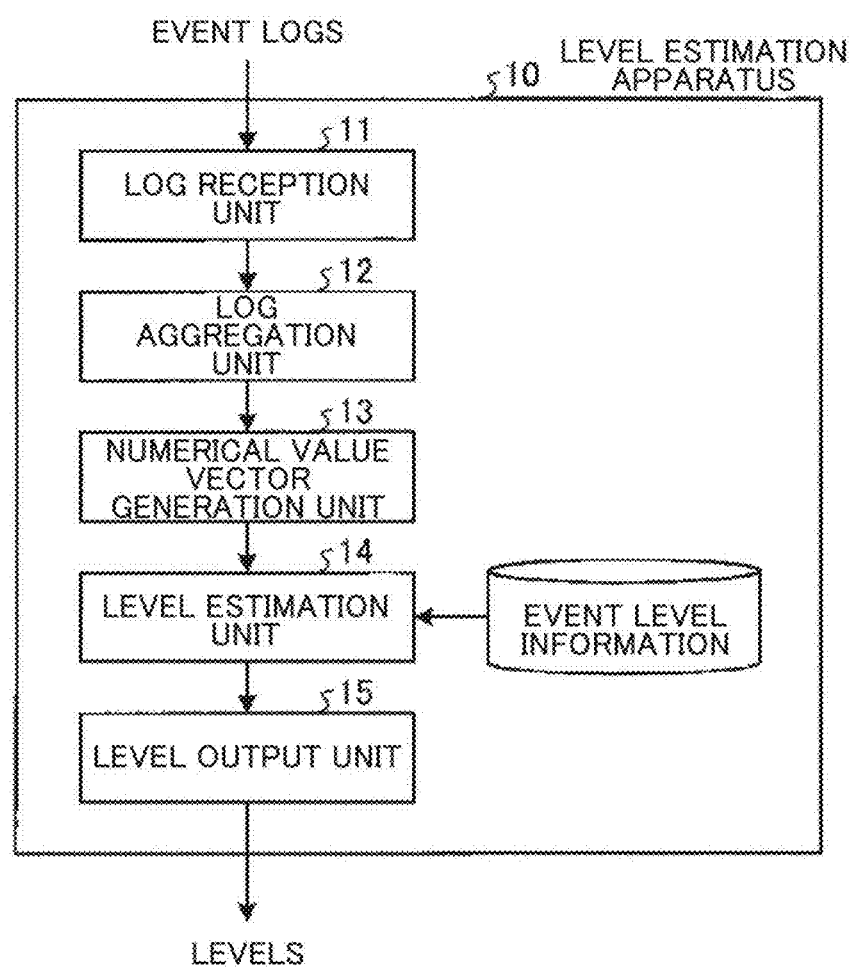
FIG. 2 is a diagram showing an exemplary configuration of the level estimation apparatus of the first embodiment.

The description of FIG. 2 is now resumed. The log aggregation unit 12 aggregates event logs related to the same event among the event logs accepted by the log reception unit 11. Then, in a case where the aggregated event logs include event logs of common events, the log aggregation unit 12 aggregates these event logs for each of the vendors of the security devices. For example, as shown in FIG. 4, the log aggregation unit 12 aggregates event logs with the same event name, and in a case where the aggregated event logs include event logs of security devices of a plurality of different vendors, the log aggregation unit 12 aggregates these event logs on a per-vendor basis.

Note that a method in which the log aggregation unit 12 considers which event logs are related to the same event is arbitrary; however, for example, it is possible to use a method in which event logs with the same event name are considered to be related to the same event, as described above. Other than that, for example, it is also possible to use a method in which events are considered to be the same in consideration of a combination of an event name, the direction of communication, whether communication has been blocked, and the like. Also, when aggregating event logs, the log aggregation unit 12 may use all event logs received by the log reception unit 11 as targets, or may use, for example, partial event logs, such as event logs in a predetermined period of time, as targets.

Figures 5, 6:
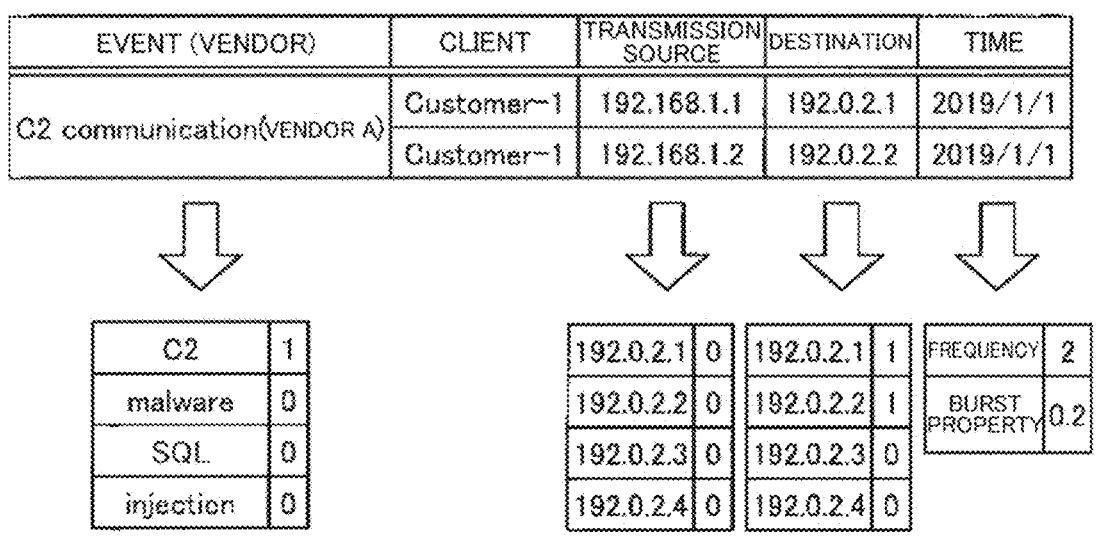
FIG. 5 is a diagram for describing an example of a procedure for generating numerical value vectors from aggregated event logs.
FIG. 6 is a diagram showing an example of event level information.

The description of FIG. 2 is now resumed. The numerical value vector generation unit 13 generates numerical value vectors from the event logs aggregated by the log aggregation unit 12. For example, as shown in FIG. 5, the numerical value vector generation unit 13 converts pieces of information included in the event logs aggregated by the log aggregation unit 12 into vectors, respectively, and combines the converted vectors, thereby generating one numerical value vector with respect to one event.

For example, with respect to the event names included in the aggregated event logs, the numerical value vector generation unit 13 generates vectors by performing one-hot encoding based on a keyword. For example, a character string related to an attack (e.g., C2, malware, SQL, injection, and the like) is used as the keyword here. Also, for example, a character string that is common to a large number of event names or event names of a plurality of vendors is used as the keyword.

For example, with respect to the transmission sources and destinations included in the aggregated event logs, the numerical value vector generation unit 13 generates vectors through one-hot encoding based on global IP addresses. Also, the numerical value vector generation unit 13 may generate vectors by further adding combinations with private IPs and clients (client names) to the vectors generated by the foregoing method. Note that in order to reduce the number of IP addresses necessary for vector generation, the numerical value vector generation unit 13 may generate vectors with use of IP addresses of transmission sources and destinations of an event that is known to have a high level.

Furthermore, with respect to the transmission sources, destinations, and times included in the aggregated event logs, the numerical value vector generation unit 13 may generate vectors with use of values obtained by quantifying the detection frequencies, the total number of detections, and the burst properties of events with use of information thereof, and the unique number of IP addresses of the transmission sources and destinations.

The method of generating numerical value vectors is not limited to the foregoing; other elements included in the aggregated event logs may be added, or only a part of the foregoing may be used.

The level estimation unit 14 calculates the degrees of similarity among the numerical value vectors of respective events, and estimates the levels of events represented by numerical value vectors based on the calculated decrees of similarity among the numerical value vectors of events and on the level of an event of at least one of the numerical value vectors. Here, in the calculation the aforementioned degrees of similarity among numerical value vectors, the level estimation unit 14 takes into consideration the degrees of similarity to the numerical value vectors of the aforementioned common events in calculating the degree of similarity between the numerical value vectors of events detected by security devices of different vendors.

Specifically, the level estimation unit 14 calculates the degrees of similarity among the numerical value vectors of respective vendors in consideration of the degrees of similarity between the numerical value vectors of common events and the numerical value vectors of respective vendors among the numerical value vectors of events detected by security devices of a plurality of different vendors (hereinafter abbreviated as "the numerical value vectors of vendors" where appropriate). Then, the level estimation unit 14 estimates the level of an event represented by each numerical value vector based on the calculated degrees of similarity among the numerical value vectors of respective vendors and on the level of an event of at least one of the numerical value vectors.

For example, when calculating the degrees of similarity among the numerical value vectors of respective vendors, the level estimation unit 14 calculates the degrees of similarity among the numerical value vectors of respective vendors with use of a vector space in which the degree of similarity between the numerical value vectors of the same event detected by different vendors (common events) is equal to or higher than a predetermined value while maintaining the similarity relationship between the numerical value vectors of the same vendor.

In one example, the level estimation unit 14 converts the numerical value vectors generated by the numerical value vector generation unit 13 into, for example, embedded vectors that satisfy the following conditions.

(1) The similarity relationship among the numerical value vectors of the same vendor is saved.

(2) Embedded vectors of the same event detected by different vendors (common events) are similar to each other.

Note that with regard to (1), when saving the similarity relationship among the numerical value vectors of the same vendor, the degrees of similarity among respective numerical value vectors may be saved, or only the order of the degrees of similarity may be saved.

Also, while the description will be provided using an exemplary case where the level estimation unit 14 uses the degrees of similarity among the numerical value vectors obtained by aggregating the event logs of respective security devices as the degrees of similarity among the events of the security devices of respective vendors, no limitation is intended by this. For example, the level estimation unit 14 may use the matching properties of keywords, transmission sources, and destinations in the information obtained by aggregating the event logs of security devices, the co-occurring properties of events, and the like as the degrees of similarity among the events of security devices of respective vendors.

For example, the level estimation unit 14 converts the space of the numerical value vectors indicated by reference sign 101 in FIG. 1 into the space of the embedded vectors indicated by reference sign 102 based on the aforementioned conditions (1) and (2). That is to say, the level estimation unit 14 performs the conversion so that, with respect to the embedded vectors Of each of the vendors A and B, the distance between the embedded vectors of common events that differ from each other only in the vendor (the ○ marks in FIG. 1) becomes as short as possible while maintaining the similarity relationship between the embedded vectors of the same vendor, as indicated by reference sign 102.

Furthermore, when estimating the levels of events represented by embedded vectors, the level estimation unit 14 uses the degrees of similarity to an embedded vector of an event with a known level.

For example, the level estimation unit 14 accepts, in advance, the input of information indicating event names and the levels of the events with these event names (event level information; see FIG. 6). Then, the level estimation unit 14 estimates the level of an embedded vector whose level is to be estimated with use of the degree of similarity between an embedded vector whose level has been specified from the event level information and the embedded vector whose level is to be estimated.

Note that the levels of events can be, for example, Primary, Secondary, and the like, but may also be discrete numerical values, continuous values, and the like. Also, it is sufficient that the level of at least one of the events detected by the security devices of all vendors be set in the event level information (see FIG. 6).

For example, after calculating the degrees of similarity among respective embedded vectors indicated by reference sign 102 in FIG. 1, the level estimation unit 14 specifies, for example, the level of the embedded vector of the Δ mark in FIG. 1 based on the aforementioned event level information. Then, the level estimation unit 14 estimates the levels of the events of other respective embedded vectors based on the degrees of similarity (the distances) among the events of the embedded vector of the Δ mark and other respective embedded vectors.

Note that the level estimation unit 14 may estimate only the levels of the embedded vectors of events with unknown levels among the embedded vectors, or may estimate the levels of all embedded vectors.

Also, according to the aforementioned level estimation method, the level of each event can be estimated with high accuracy even in a case where, for example, the number of events with known levels among a group of events detected by respective security devices is small.

The level output unit 15 outputs the levels estimated by the level estimation unit 14.

Figure 7:
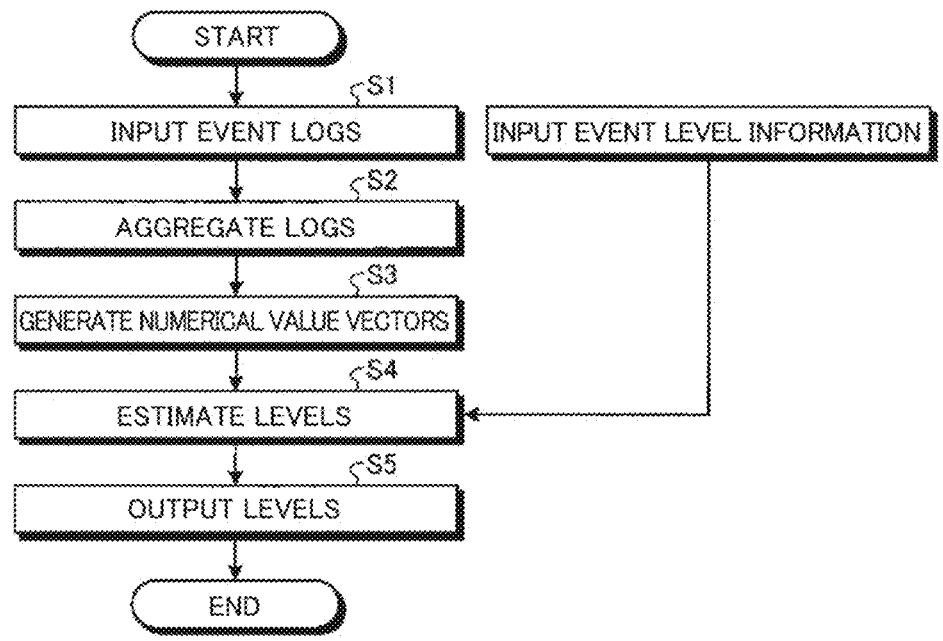
FIG. 7 is a flowchart showing an example of a processing procedure of the level estimation apparatus of the first embodiment.

[Processing Procedure] Next, an example of a processing procedure of the level estimation apparatus 10 will be described using FIG. 7. First, once the log reception unit 11 of the level estimation apparatus 10 has accepted the inputs of event logs (S1), the log aggregation unit 12 aggregates the event logs (S2: aggregate logs). Next, the numerical value vector generation unit 13 generates numerical value vectors of the event logs aggregated in S2 (S3). Thereafter, using the numerical value vectors generated in S3, the level estimation unit 14 estimates the levels of the events indicated by the event logs accepted in S1 (S4). Note that when the level estimation unit 14 estimates the levels of the events in S4, the input of event level information (see FIG. 6) is accepted, and the levels of the events are estimated with reference to this event level information. Thereafter, the level output unit 15 outputs the result of estimation of the levels (S5: output levels).

Figure 8:
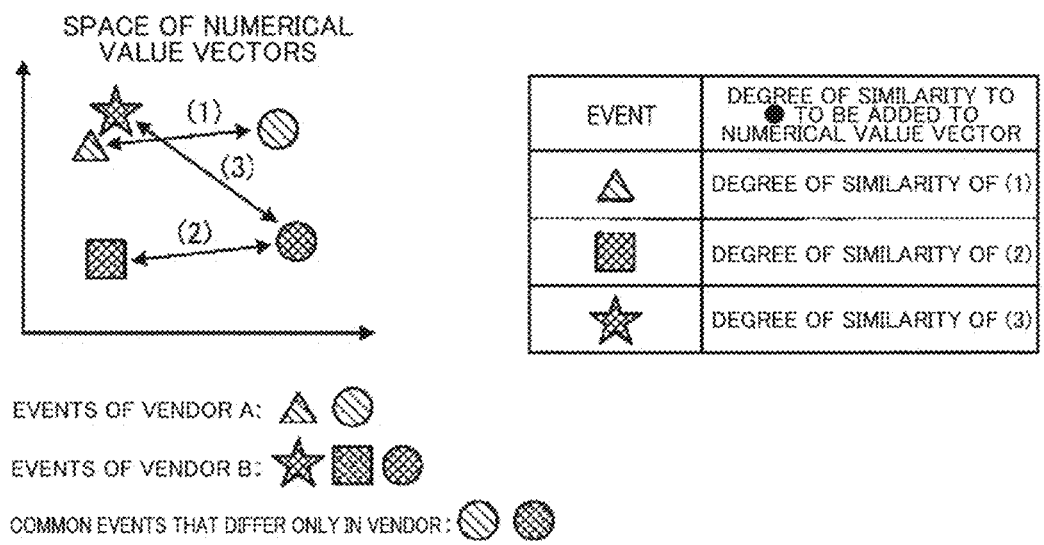
FIG. 8 is a diagram for describing level estimation in a level estimation apparatus of a second embodiment.

[Second Embodiment] Next, a method of estimating levels in the level estimation unit 14 in the level estimation apparatus 10 of a second embodiment will be described with reference to FIG. 8.

Note that the level estimation apparatus 10 aggregates event logs of the events detected by respective security devices, similarly to the level estimation apparatus 10 of the first embodiment. For example, the level estimation apparatus 10 aggregates event logs of security devices of the vendor A on a per-event basis, and obtains, for example a numerical value vector of the Δ mark and a numerical value vector of the ○ mark shown In FIG. 8. Also, the level estimation apparatus 10 aggregates event logs of security devices of the vendor B on a per-event basis, and obtains a numerical value vector of the star mark, a numerical value vector of the □ mark, and a numerical value vector of the ○ mark shown in FIG. 8. Note that in FIG. 8, the numerical value vectors of the ○ marks are numerical value vectors of an event that is common to the vendors A and B (common events).

The level estimation unit 14 First calculates the degree of similarity between the numerical value vector of the Δ mark of the vendor A and the numerical value vector of the ○ mark of the vendor A, and adds the degree of similarity to the numerical value vector of the Δ mark of the vendor A. Similarly, the level estimation unit 14 calculates the degree of similarity between the numerical value vector of the □ mark of the vendor B and the numerical value vector of the ○ mark of the vendor B, and adds the degree of similarity to the numerical value vector of the □ mark of the vendor B. Also, the level estimation unit 14 calculates the degree of similarity between the numerical value vector of the start mark of the vendor B and the numerical value vector of the ○ mark of the vendor B, and adds the degree of similarity to the numerical value vector of the star mark of the vendor B.

Next, the level estimation unit 14 performs machine learning by using, among the numerical value vectors, the numerical value vectors of events with known levels as supervisory data, and constructs a classifier. Note that in a case where the numerical value vectors of events with relatively low levels cannot be obtained as supervisory data, the level estimation unit 14 may perform machine learning while handling the numerical value vectors of events with unknown levels as the numerical value vectors of events with low levels. There is no problem using the aforementioned problem as long as it is known in advance that the percentage of the numerical value vectors of events whose actual levels are high in a group of numerical value vectors of events with unknown levels is low.

Then, using the constructed classifier, the level estimation unit 14 predicts the levels of events represented by respective numerical value vectors.

That is to say, first, with respect to each numerical value vector, the level estimation unit 14 calculates the degree of similarity to the numerical value vector of a common event of the same vendor. Next, the level estimation unit 14 generates information by adding, to each of the numerical value vectors, the degree of similarity to the numerical value vector of the common event of the same vendor as the numerical value vectors. Then, the level estimation unit 14 performs machine learning by using the generated information and the level of the event of at least one of the numerical value vectors as supervisory data, and constructs a classifier for estimating the levels of events represented by respective numerical value vectors. Thereafter, using the constructed classifier, the level estimation unit 14 estimates the levels of events represented by respective numerical value vectors. The aforementioned level estimation method allows general supervised machine learning to be used in the construction of the classifier used for estimating the levels of events, thereby bringing about a merit whereby the construction of the classifier is relatively easy.

Note that although the description has been provided using an exemplary case where the level estimation unit 14 uses the degrees of similarity among numerical value vectors as the degrees of similarity, it is permissible to use, for example, the matching properties of keywords, transmission sources, and destinations, the co-occurring properties of events, and the like. Furthermore, although the level estimation unit 14 can add the degrees of similarity to all common events to a numerical value vector, the level estimation unit 14 may add only the degree of similarity to a part of the common events thereto.

Note that similarly to the first embodiment described earlier, although the level estimation unit 14 may estimate only the levels of the numerical value vector generation unit 13 of events with unknown levels, the level estimation unit 14 may estimate the levels of numerical value vectors of all events.

[Third Embodiment] Next, a method of estimating levels in the level estimation unit 14 in the level estimation apparatus 10 of a third embodiment will be described with reference to FIG. 9.

Note that the level estimation apparatus 10 aggregates event logs of the events detected by respective security devices, similarly to the level estimation apparatus 10 of the first embodiment. For example, the level estimation apparatus 10 aggregates event logs of security devices of the vendor A on a per-event basis, and obtains, for example, a numerical value vector of the Δ mark and a numerical value vector of the ○ mark indicated by reference sign 902 in FIG. 9. Also, the level estimation apparatus 10 aggregates event logs of security devices of the vendor B on a per-event basis, and obtains a numerical value vector of the star mark, a numerical value vector of the □ mark, and a numerical value vector of the ○ mark indicated by reference sign 902 in FIG. 9. Note that in FIG. 9, the numerical value vectors of the ○ marks are numerical value vectors of an event that is common to the vendors A and B (common events).

First, the level estimation unit 14 uses the numerical value vectors of events with known levels, as well as the levels thereof, as supervisory data, and constructs a classifier that estimates the levels of events represented by respective numerical value vectors. The classifier constructed here is a classifier that converts numerical value vectors into predetermined embedded vectors, and estimates the levels of events represented by respective embedded vectors with use of the converted embedded vectors.

Figure 9:
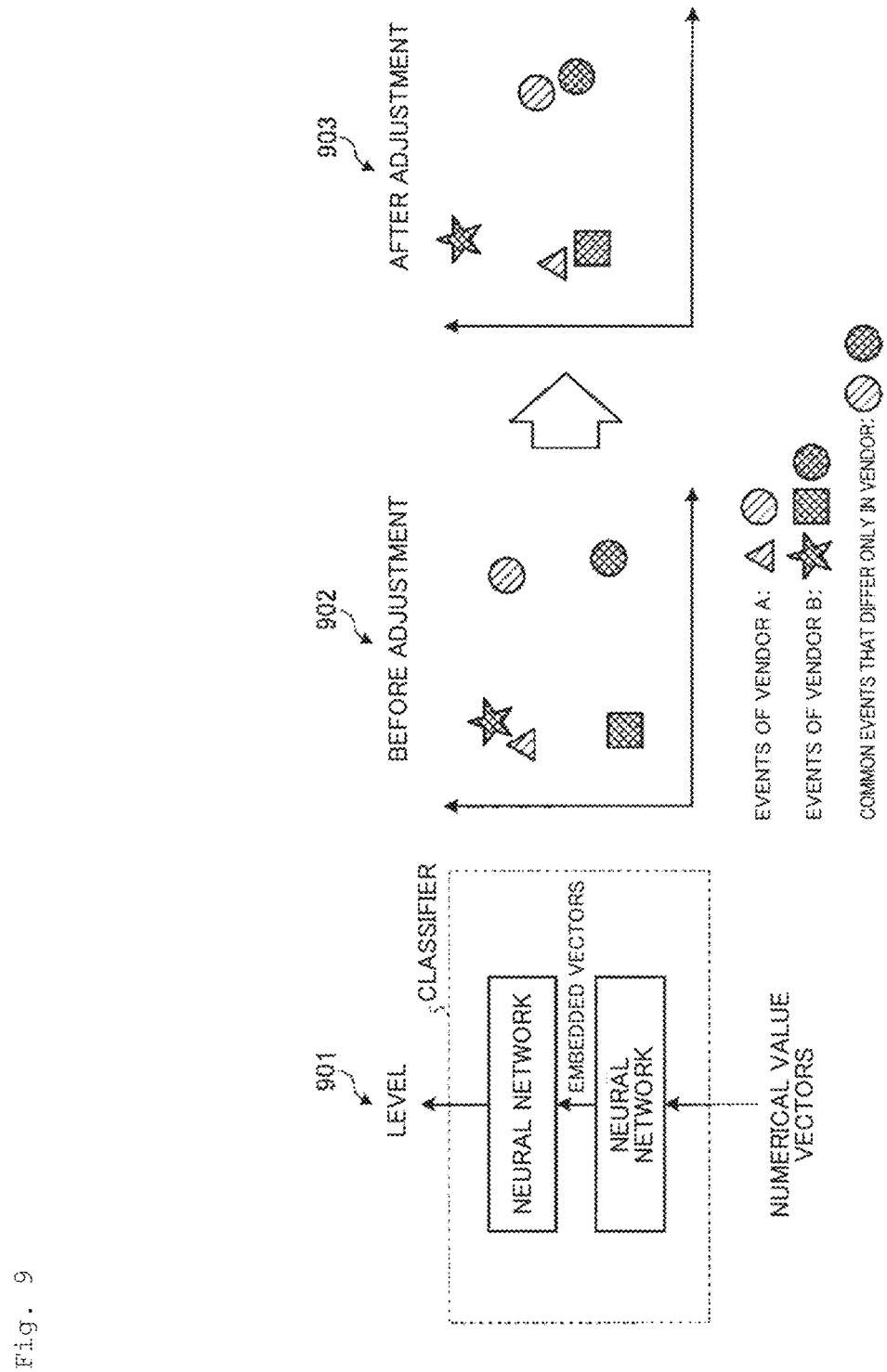
FIG. 9 is a diagram for describing level estimation in a level estimation apparatus of a third embodiment.

As indicated by reference sign 901 in FIG. 9, this classifier includes, for example, a neural network that converts numerical value vectors into embedded vectors, and a neural network that estimates the levels of events represented by respective embedded vectors with use of the converted embedded vectors.

Using the embedded vectors converted by the aforementioned classifier, the level estimation unit 14 calculates the degrees of similarity among these embedded vectors. Then, the level estimation unit 14 adjusts the classifier based on the calculated degrees of similarity among embedded vectors. Here, the classifier is adjusted so as to satisfy the following conditions.

(1) The similarity relationship among embedded vectors of the same vendor is saved.

(2) Embedded vectors of the same event detected by different vendors (common events) are s lar to each other.

By adjusting the classifier in the foregoing manner, for example, the space of embedded vectors indicated by reference sign 902 is placed in a state where the degree of similarity between embedded vectors of common events is high, and the similarity relationship among embedded vectors of the same vendor is maintained, as indicated by reference sign 903. Then, using the adjusted classifier, the level estimation unit 14 estimates the levels of events represented by numerical value vectors.

Note that similarly to the first embodiment and the second embodiment described earlier, although the level estimation unit 14 may estimate only the levels of numerical value vectors of events with unknown levels, the level estimation unit 14 may estimate the levels of numerical value vectors of all events.

The method of estimating the levels in the third embodiment brings about a merit whereby the levels of respective events can be estimated even in a case where the method of calculating the degrees of similarity among numerical value vectors is not certain.

[Exemplary Application] By using the level estimation apparatus 10 of each embodiment, for example, an alert (event log) for specifying an incident at an SOC (Security Operation Center) can be analyzed efficiently. This will be described using FIG. 10 and FIG. 11.

Figure 10:
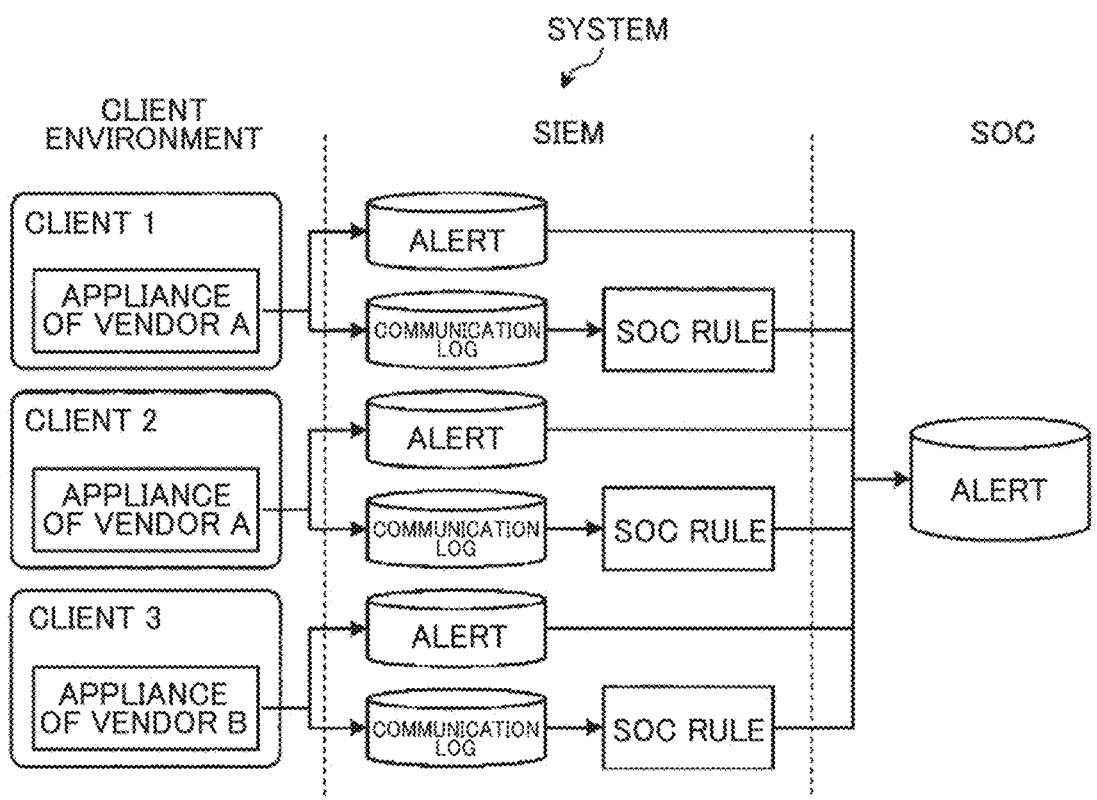
FIG. 10 is a diagram showing an exemplary configuration of a system to which the level estimation apparatus of each embodiment is applied.
Figure 11:
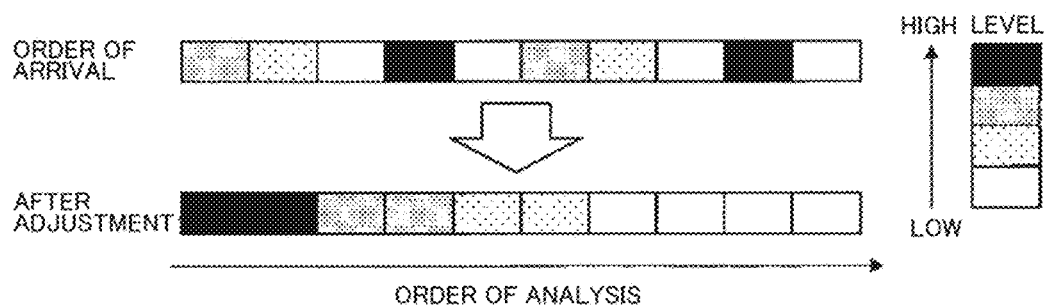
FIG. 11 is a diagram showing examples of alerts that have been rearranged in accordance with a result of level estimation performed by the level estimation apparatus of each embodiment.

First, an exemplary configuration of a system that includes an SOC will be described using FIG. 10. The system includes, for example, a client environment, SIEM (Security information and Event Management), and the SOC.

In the client environment, a security appliance (hereinafter abbreviated as an appliance), such as UTM (Unified Threat Management), has been introduced for each client. The vendor of the appliance varies with each client. For example, appliances of the vendor A have been introduced for clients 1 and 2, and an appliance of the vendor B has been introduced for a client 3. Once each appliance has detected a security event, an alert that gives notice of the detection is transmitted to the SIEM. Also, each appliance transmits a communication log at the time of the detection of the security event to the SIEM.

The SIEM applies a detection rule developed by the SOC (an SOC rule) to the communication logs of respective clients, and transmits an alert to the SOC upon detecting a security event under this rule. Also, the SIEM similarly transmits an alert transmitted from the appliance of each client as well to the SOC.

Thereafter, the level estimation apparatus 10 of each embodiment estimates the levels of events indicated by respective alerts with use of the alerts received by the SOC and the levels of events set by an analyzer of the SOC. Note that the levels that have been set in advance based on the relationships with incidents are used.

Then, the analyzer who analyzes the alerts transmitted to the SOC determines from which alert the analysis should be made in order based on the levels of events of respective alerts estimated by the aforementioned level estimation apparatus 10. In this way, for example, the analyzer can adjust the order so as to make the analysis in order from an alert of an event with a higher level. As a result, for example, the period of time until an incident is specified can be reduced compared to a case where the analyzer makes the analysis in order of the arrival of alerts (see FIG. 11).

[Program] Also, a program that realizes the functions of the level estimation apparatus 10 described in the embodiments above can be implemented by way of installation on a desired information processing apparatus (computer). For example, the information processing apparatus can be caused to function as the level estimation apparatus 10 by causing the information processing apparatus to execute the aforementioned program which is provided as packaged software or online software. Examples of the information processing apparatus mentioned here include a desktop or notebook personal computer and a rackmount server computer. Also, other than these, the scope of The examples of the information processing apparatus includes such mobile communication terminals as a smartphone, a mobile telephone device, and a PHS (Personal Handyphone System), as well as PDAs (Personal Digital Assistants). In addition, the level estimation apparatus 10 may be implemented in a cloud server.

Figure 12:
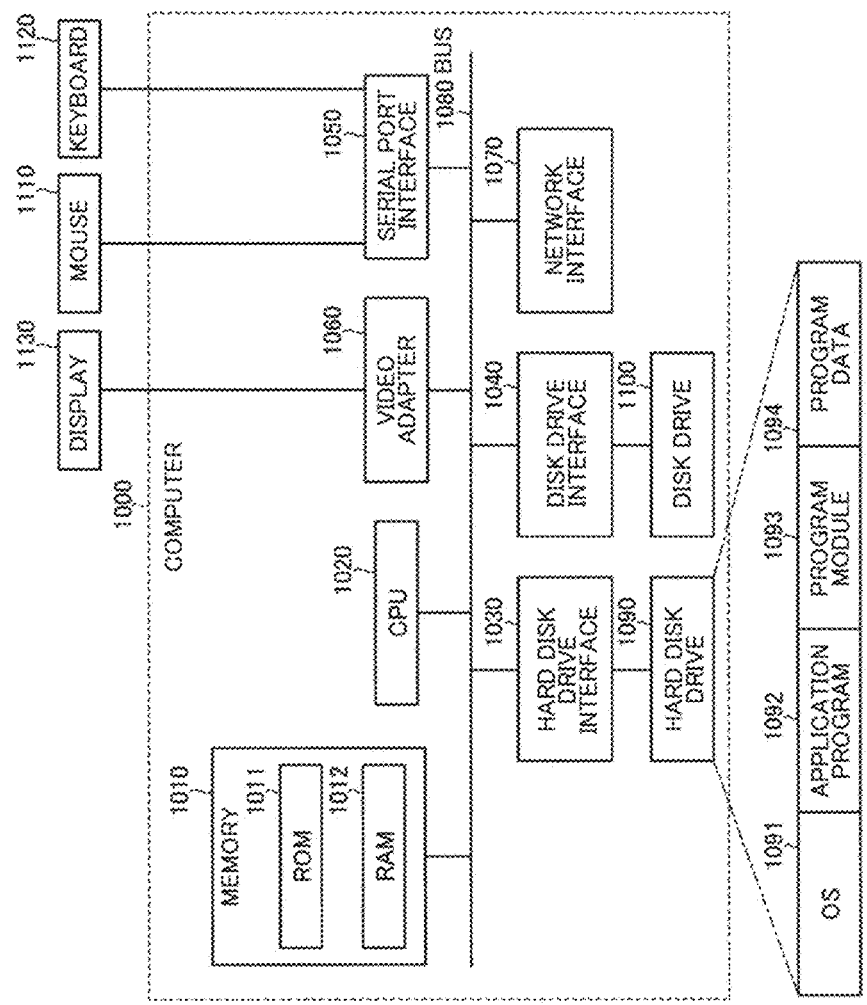
FIG. 12 is a diagram showing an example of a computer that executes a level estimation program.

An example of a computer that executes the aforementioned program (level estimation program) will be described using FIG. 12. As shown in FIG. 12, a computer 1000 includes, for example, a memory 1010, a CPU 1020, a hard disk drive interface 1030, a disk drive interface 1040, a serial port interface 1050, a video adapter 1060, and a network interface 1070. These respective components are connected via a bus 1080.

The memory 1010 includes a RCM (Read Only Memory) 1011 and a RAM (Random Access Memory) 1012. For example, a boot program, such as BIOS (Basic Input Output System), is recorded in the ROM 1011. The hard disk drive interface 1030 is connected to a hard disk drive 1090. The disk drive interface 1040 is connected to a disk drive 1100. For example, an attachable and removable storage medium, such as a magnetic disk and an optical disc, is inserted in the disk drive 1100. For example, a mouse 1110 and a keyboard 1120 are connected to the serial port interface 1050. For example, a display 1130 is connected to the video adapter 1060.

Here, as shown in FIG. 12, for example, an OS 1091, an application program 1092, a program module 1093, and program data 1094 are stored in the hard disk drive 1090. Various types of data and information described in the embodiments above are stored in, for example, the hard disk drive 1090 and the memory 1010.

Then, the aforementioned respective procedures are executed by the CPU 1020 reading out the program module 1093 and the program data 1094 stored in the hard disk drive 1090 to the RAM 1012 as necessary.

Note that the program module 1093 and the program data 1094 according to the aforementioned level estimation program are not limited to being stored in the hard disk drive 1090, and may be, for example, stored in an attachable and removable storage medium and read out by the CPU 1020 via the disk drive 1100 and the like. Alternatively, the program module 1093 and the program data 1094 according to the aforementioned program may be stored in another computer connected via a network, such as a LAN and a WAN (Wide Area Network), and read out by the CPU 1020 via the network interface 1070.

REFERENCE SIGNS LIST

10 Level estimation apparatus
11 Log reception unit
12 Log aggregation unit
13 Numerical value vector generation unit
14 Level estimation unit
15 Level output unit

The invention claimed is:

1. A level estimation apparatus comprising:
processing circuitry configured to:
receive event logs of events detected by a device or software; and
calculate degrees of similarity among the events indicated by the event logs with use of the event logs, and
estimate a level of a predetermined event based on the calculated degrees of similarity among the events and a level of at least one of the events,
wherein in the calculation of the degrees of similarity among the events, when a degree of similarity between events detected by at least one of different devices or items of software is calculated, a degree of similarity to a common event is used, the common event being an event that has been detected mutually by at least one of the different devices or items of software, and
when calculating the degrees of similarity among the events, the processing circuitry is further configured to calculate the degrees of similarity among the events by performing a conversion into embedded vectors of a vector space in which a degree of similarity between same events detected by at least one of the different devices or items of software is equal to or higher than a predetermined value while maintaining a similarity relationship between events detected by a same device or software.

2. The level estimation apparatus according to claim 1, wherein the processing circuitry is further configured to calculate, with respect to each of the events, a degree of similarity to the common event detected by a device or software that is the same as a device or software that has detected the event, generate information by adding, to each of pieces of information indicating characteristics of the event, the degree of similarity to the common event detected by the device or software that is the same as the at least one of the device or software that has detected the event, construct a classifier for estimating levels of the events by using the generated information and a level of at least one of the events as supervisory data, and estimate a level of a predetermined event with use of the constructed classifier.

3. The level estimation apparatus according to claim 1, wherein the processing circuitry is further configured to construct a classifier that, by using the events with known levels and the levels of the events as supervisory data, converts the event logs of the events into predetermined numerical value vectors, respectively, and estimates a level of a predetermined event with use of the converted numerical value vectors, calculate the degrees of similarity among the events with use of the numerical value vectors converted by the constructed classifier, adjust the classifier based on the calculated degrees of similarity among the events so that a degree of similarity between same events detected by the different devices or items of software is equal to or higher than a predetermined value while maintaining a similarity relationship between events detected by at least one of a same device or software, and estimate a level of a predetermined event with use of the adjusted classifier.

4. The level estimation apparatus according to claim 3, wherein the processing circuitry generates the predetermined numerical vectors based on one-hot encoding corresponding global IP addresses.

5. The level estimation apparatus according to claim 1, wherein
the different devices or items of software are devices or items of software of different vendors, and
a same device or software is a device or software of a same vendor.

6. The level estimation apparatus according to claim 1, wherein the common event that is identified mutually by the different devices or items of software is identified based on event logs with a same name.

7. The level estimation apparatus according to claim 6, wherein the common event that is identified mutually by the different devices or items of software is further identified based on a direction of communications in the event logs with the same name.

8. The level estimation apparatus according to claim 7, wherein the common event that is identified mutually by the different devices or items of software is further identified based on whether the communications in the event logs with the same name are blocked.

9. A level estimation method comprising:
receiving event logs of events detected by a device or software; and
calculating degrees of similarity among the events indicated by the event logs with use of the event logs, and estimating a level of a predetermined event based on the calculated degrees of similarity among the events and a level of at least one of the events, by processing circuitry,
wherein in the calculation of the degrees of similarity among the events, when a degree of similarity between events detected by at least one of different devices or items of software is calculated, a degree of similarity to a common event is used, the common event being an event that has been detected mutually by at least one of the different devices or items of software, and
when calculating the degrees of similarity among the events, the method further comprises calculating the degrees of similarity among the events by performing a conversion into embedded vectors of a vector space in which a degree of similarity between same events detected by at least one of the different devices or items of software is equal to or higher than a predetermined value while maintaining a similarity relationship between events detected by a same device or software.

10. A non-transitory computer-readable recording medium storing therein a level estimation program that causes a computer to execute a process comprising:
receiving event logs of events detected by a device or software; and
calculating degrees of similarity among the events indicated by the event logs with use of the event logs, and estimating a level of a predetermined event based on the calculated degrees of similarity among the events and a level of at least one of the events,
wherein in the calculation of the degrees of similarity among the events, when a degree of similarity between events detected by at least one of different devices or items of software is calculated, a degree of similarity to a common event is used, the common event being an event that has been detected mutually by at least one of the different devices or items of software, and
when calculating the degrees of similarity among the events, the process further comprises calculating the degrees of similarity among the events by performing a conversion into embedded vectors of a vector space in which a degree of similarity between same events detected by at least one of the different devices or items of software is equal to or higher than a predetermined value while maintaining a similarity relationship between events detected by a same device or software.

* * * * *